United States Patent [19]
Perrott

[11] Patent Number: 4,926,897
[45] Date of Patent: May 22, 1990

[54] AUTOMATIC FLUID PRESSURE EQUALIZING VALVE

[75] Inventor: Charles H. Perrott, Portland, Oreg.
[73] Assignee: C. H. Perrott, Inc., Portland, Oreg.
[21] Appl. No.: 364,140
[22] Filed: Jun. 12, 1989
[51] Int. Cl.⁵ ............................................. G05D 7/01
[52] U.S. Cl. .................................................. 137/98
[58] Field of Search .................................. 137/98, 100

[56] References Cited

U.S. PATENT DOCUMENTS

| | | | |
|---|---|---|---|
| 2,090,843 | 8/1937 | King | 137/98 |
| 2,593,701 | 4/1952 | Sanford | 137/98 |
| 2,647,529 | 8/1953 | Wall | 137/98 |
| 2,849,015 | 8/1958 | Colson | 137/98 |
| 2,990,840 | 7/1961 | Snow | 137/98 |
| 3,120,854 | 2/1964 | Shimooka | 137/98 |
| 4,640,309 | 2/1987 | Hoffman et al. | 137/596.14 X |

FOREIGN PATENT DOCUMENTS 2401648  7/1974  Fed. Rep. of Germany ...... 137/100

Primary Examiner—Gerald A. Michalsky
Attorney, Agent, or Firm—Eugene D. Farley

[57] ABSTRACT

A valve for proportioning hot and cold water flow in response to the pressure balance between the hot and cold water supply lines includes a piston which adjusts position in response to variation in the pressure ratio of the hot and cold water supplied to the valve, thereby maintaining a uniform temperature of the water delivered by the valve. Provision is made for preventing leakage of the respective hot and cold fluids within the valve, and for preventing "hammer" during operation of the valve.

3 Claims, 1 Drawing Sheet

AUTOMATIC FLUID PRESSURE EQUALIZING VALVE

This invention relates to a valve for proportioning hot and cold water flow in response to the pressure balance between the hot and cold water supply lines. Although described herein with reference to aqueous flow in particular, it will be apparent that it is applicable also to the flow of other liquids as well.

BACKGROUND AND GENERAL STATEMENT OF THE INVENTION

The invention described in the present application is an improvement over that described in Sanford, U.S. Pat. No. 2,593,701, issued Apr. 22, 1952.

In domestic or institutional shower facilities, textile mills and like industrial installations where supply of constant temperature water is required, it is important that means be present for compensating the flow of hot and cold water for variations in the water supply pressure. The problem occurs most commonly in domestic shower baths where sudden external draw-off of cold water in the system lower the cold water supply pressure to the shower head. This results in hot or even scalding water being discharged from the shower head with resulting hazard, or at least discomfort, to the user.

It is the general purpose of the present invention to provide an improved valve useful in the foregoing and other situations to eliminate temperature variations caused by pressure fluctuations occurring in either the hot or cold water supply lines.

It is a further object of the present invention to provide a pressure compensating valve of the class described in which the parts are sealed against each other in the assembly of the valve without distortion and without requiring that extremely close tolerances be held on the interfitting parts.

Still another object of the present invention is the provision of a valve of the class described which is sealed against internal leakage.

Still a further object of the present invention is the provision of a valve of the class described which in operation is free from problems of water hammer.

Yet another object of the present invention is the provision of a pressure compensating valve of the class described which is characterized by a high degree of sensitivity, simplified construction, and the utilization of a minimum number of easily assembled component parts.

The foregoing and other objects of the invention are achieved by the provision of an automatic pressure compensating valve which, broadly considered, comprises a unitary valve body apertured to provide a central axial cavity open at one end. A sleeve is disposed within the cavity. The valve body has hot and cold water inlet and outlet passages. The sleeve has ports providing fluid communication between the hot water inlet and outlet passages and between the cold water inlet and outlet passages of the body, respectively.

A pressure balancing piston is disposed for movement within the sleeve. It has surfaces acted upon by the fluid pressure in both the hot and cold water inlet passages, and is responsive thereto. Closure means carried by the piston inversely obstructs the sleeve ports between the hot water inlet and outlet passages and the sleeve ports between the cold water inlet and outlet passages in response to a variation in the ratio of fluid pressures in the inlet passages.

O-ring seal means on the closure means prevent leakage of hot or cold water from one side to the other of the piston.

Resilient pads on each end of the piston prevent water hammer during operation of the valve.

THE DRAWINGS

DESCRIPTION OF A PREFERRED EMBODIMENT OF THE INVENTION

Figure 1:
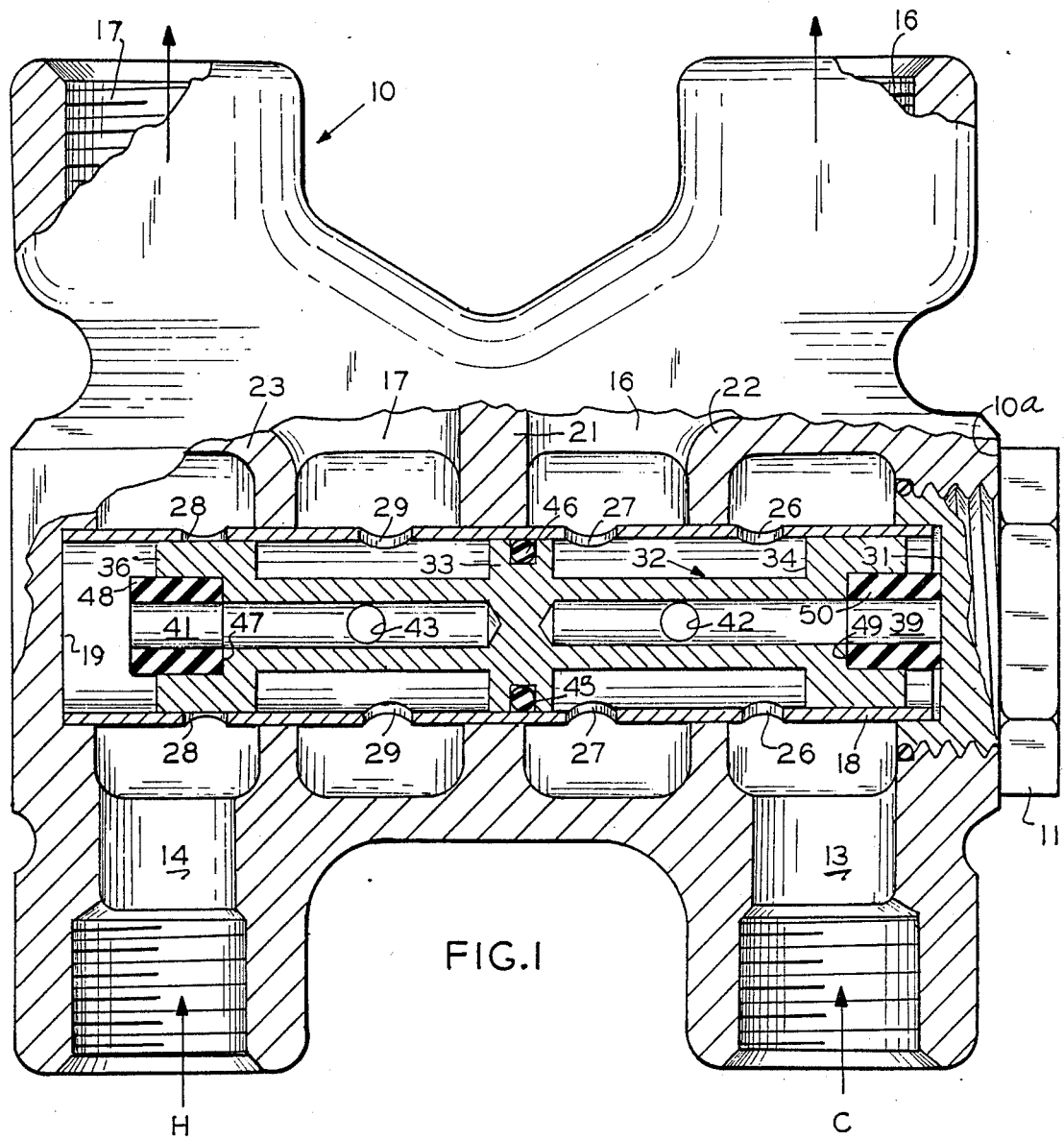
FIG. 1 is a longitudinal view of the automatic compensating valve of my invention, partly in section.
Figure 2:
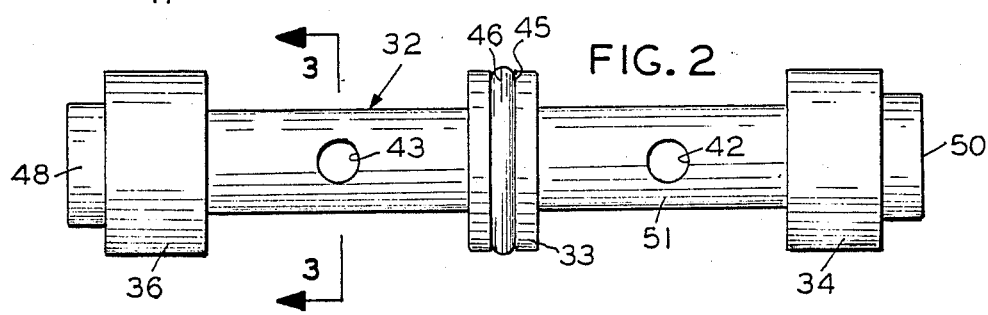
FIG. 2 is a view in side elevation of the piston component thereof.
Figure 3:
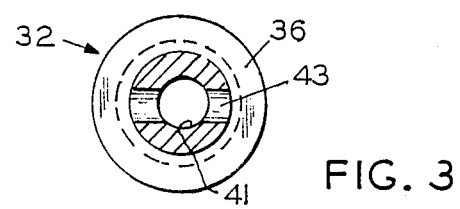
FIG. 3 is a transverse sectional view taken along line 3—3 of FIG. 2.

As is illustrated in the drawings, the valve of my invention comprises a housing 10 cast or otherwise formed of a suitable material such as bronze. The valve body is provided with an axial cavity, open at one end. The open end of the axial cavity is closed by the threaded plug 11 which is threaded into the valve body after assembly of the internal parts of the valve to be subsequently described.

A cold water inlet passage 13 and a hot water inlet passage 14 are formed in the valve body and communicate with the central cavity. The cavity further has communicating therewith a cold water outlet passage 16 and a hot water outlet passage 17.

Disposed within the central cavity and substantially coextensive therewith is a sleeve 18 which may be formed of a material such as stainless steel.

The integrally closed end of the housing is provided with a recess 19 which is dimensioned so as to receive the sleeve 18 in a snug fit and to seal the end of the sleeve.

The interior of the housing is provided with annular, radially inwardly extending bosses indicated at 21, 22 and 23 in FIG. 1. These annular bosses closely engage and seal against the adjacent curved face of the sleeve 18.

The boss 21 divides the body cavity into a cold water and a hot water compartment.

The annular boss 22 divides the cold water compartment into inlet and outlet portions, these having communication with the inlet passage 13 and the outlet passage 16 respectively.

The annular boss 23 similarly divides the hot water compartment into inlet and outlet portions which communicate with the inlet passage 14 and the outlet passage 17.

Fluid communication between the inlet passage 13 and the outlet passage 16 is provided by the ports 26 and 27 in the sleeve 18, the ports 26 and 27 being spaced about the circumference of the sleeve.

Thus, with the ports 26 and 27 unobstructed, water can flow from the inlet passage 13 through the ports 26, through the sleeve 18 out through the ports 27 to the outlet passage 16. Similarly, the ports 28 and 29 in the sleeve provide communication between the hot water inlet passage 14 and the hot water outlet passage 17.

As previously mentioned, the threaded plug 11 serves to seal the adjacent end of the sleeve 18 without placing a distorting axial pressure upon the end of the sleeve. This is accomplished, as may best be seen in FIG. 1, by providing the inner end face of the plug 11 with a recess 31 which closely receives the marginal side portion of the sleeve, the fit of the side wall of the sleeve and the side face of the recess 31 being such as to substantially seal this junction against the entry of water or other fluid.

The recess 31 is proportioned in depth so that when the plug 11 is threaded into the body 10 to its maximum depth, that is, when the head of the plug bottoms against the adjacent surface of the housing as indicated at 10a in FIG. 1, the end of the sleeve 18 is not engaged by the base of the recess 31, even under maximum tolerance length variation of the sleeve 18.

Disposed within the sleeve and slidably movable relative thereto is a piston 32 which may be formed of stainless steel or a similar corrosion-resistant material. The piston is provided with a central land 33 and adjacent each of its ends is provided with lands 34 and 36.

The piston is further provided with axially internal bores 39 and 41 which terminate at the central land 33. The bore 39 communicates with the interior of the sleeve 18 by means of two series of apertures indicated at 42. Similarly, the interior of the bore 41 communicates with the interior of the piston 18 through two series of apertures 43.

Land 33 of piston 32 is provided with an annular groove 45. Seated within the groove is an O-ring 46. This serves to prevent leakage between the hot and cold passages of the valve, thereby improving its efficiency.

Means also is provided for preventing the water hammer which might occur because of the inertia of the piston as it reciprocates between its two positions and strikes against the valve body.

To accomplish this purpose, the bores 39, 41 of the piston have at their outer portions segments of increased diameter 47, 49 respectively. These receive in a friction fit longitudinally perforated compressible pads or sleeves 48, 50 respectively which serve as bumpers at the extreme limit of piston stroke in each direction. The perforations in the sleeves preferably comprise longitudinal bores coaxial with piston bores 39, 41.

In operation, the valve may be installed with its inlet passages 13 and 14 connected to the cold and hot water service lines, respectively. The outlet passages 16 and 17 may be connected to a device, such as a shower head, having a manually operable valve controlling the flow of cold and hot water to the shower head.

In FIG. 1, the piston is shown in solid lines in the position which it assumes when, because of external withdrawals or the like, the cold water service pressure has been completely cut-off. Under these conditions, the pressure of the hot water (still at line pressure) acting on the right hand end of the piston and upon the end surface of the bore 41 moves the piston to an extreme right-hand position as shown in FIG. 1. The supply of hot water to the shower head is thus cut-off while the cold water supply is off, thereby preventing scalding of the shower user.

When the cold water service pressure returns to its normal value, the piston will be shifted to the left, as viewed in FIG. 1, to open the ports 28, permitting hot water to again flow to the shower head. While the condition referred to above, i.e. complete cut-off of cold water supply, illustrates an extreme condition, where the cold water supply pressure is merely reduced rather than cut-off, the flow of hot water from the valve will be correspondingly lowered.

It will be evident from FIG. 1 that, similarly, upon a drop in service pressure of the hot water line, the piston will be shifted leftwardly to decrease the flow of cold water to the shower head. Thus, as the ratio of water pressures in the inlet passages 13 and 14 varies, the piston 32 will be shifted so as to obstruct inversely the apertures 26 and 28 to restore a balanced flow of hot and cold water through the outlet passages 16 and 17.

The diameter of the barrel portion 51 of the piston is relatively large so that under operating conditions there is a relatively small volume of water within the sleeve. Because of this relatively small volume of water within the sleeve and the obstruction to water flow provided by the shower head downstream of the valve of the present invention, there is created a back-pressure within the valve when it is operating which enhances the sensitivity of the valve in responding to even minute changes in the supply line pressures.

Upon cutting off of one of the supply lines, such as that connected to cold water inlet passage 13, the ports 28 will be totally obstructed before the end of the piston bottoms against the end face of the plug 11. However, because of the sensitivity of the valve, if the cut-off of the cold water supply line is rapid or instantaneous, inertia will carry the end of the piston against the plug 11. In this event, pads or bumpers 48, 50 muffle the audible click which may thus be generated and cushion the impact of the piston against the valve body at each end of the piston stroke.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A valve assembly comprising:
  (a) a unitary valve body 10 apertured to provide a central axial cavity open at one end,
  (b) a sleeve 18 disposed within the cavity and substantially coextensive therewith,
  (c) the valve body having a recess 19 in its closed end closely accommodating the adjacent end of the sleeve,
  (d) the valve body further having hot and cold water inlet and outlet passages 13, 16 and 14, 17,
  (e) the sleeve having ports 26, 27, and 28, 29 providing fluid communication between the hot water inlet and outlet passages 14, 17 and between the cold water inlet and outlet passages 13, 16 respectively,
  (f) a pressure balancing piston 32 disposed for movement within the sleeve and having a central land 33 and terminal lands 34, 36,
  (g) the piston also having axially internal bores 39, 41 which terminate at their inner ends substantially at the central land 33 and at their outer ends in segments 47, 49 of enlarged diameter,
  (h) the piston having also apertures 42, 43 communicating the bores with the interior of the sleeve,
  (i) the terminal lands 34, 36 being contoured and dimensioned to serve as closure means to inversely obstruct the sleeve ports between the hot water inlet and outlet passages and the sleeve ports between the cold water inlet and outlet passages in response to a variation in the ratio of fluid pressures in the inlet passages, (j) longitudinally perforated compressible pads 48, 50 mounted in axial bores 39, 41 of the piston, the perforations of the pads communicating with the said bores of the pistons, (k) and a plug 11 threaded into the valve body for closing the open end of the body cavity and the adjacent end of the sleeve.

2. The valve assembly of claim 1 wherein the longitudinally perforated compressible bumper pads comprise axially bored compressible bumper pads, the bores of the pads being substantially coaxial with the bores of the piston.

3. The valve assembly of claim 1 including O-ring seal means mounted circumferentially on central land 33 of the piston.

* * * * *